United States Patent
Nuorivaara et al.

(10) Patent No.: US 12,364,992 B2
(45) Date of Patent: Jul. 22, 2025

(54) CELLULOSE-BASED DERIVATIVES AS CHEMICAL AIDS FOR MINERAL ENRICHMENT IN FROTH FLOTATION

(71) Applicant: Aalto University Foundation sr, Aalto (FI)

(72) Inventors: Ted Nuorivaara, Aalto (FI); Rodrigo Serna Guerrero, Aalto (FI)

(73) Assignee: Aalto University Foundation sr, Aalto (FI)

( * ) Notice: Subject to any disclaimer, the term of this patent is extended or adjusted under 35 U.S.C. 154(b) by 1037 days.

(21) Appl. No.: 16/968,202

(22) PCT Filed: Jan. 13, 2019

(86) PCT No.: PCT/FI2019/050023
§ 371 (c)(1),
(2) Date: Aug. 7, 2020

(87) PCT Pub. No.: WO2019/155116
PCT Pub. Date: Aug. 15, 2019

(65) Prior Publication Data
US 2020/0391223 A1 Dec. 17, 2020

(30) Foreign Application Priority Data

Feb. 9, 2018 (FI) ............................. 20185117
Nov. 8, 2018 (FI) ............................. 20185952

(51) Int. Cl.
*B03D 1/008* (2006.01)
*B03D 1/004* (2006.01)
(Continued)

(52) U.S. Cl.
CPC .......... *B03D 1/0043* (2013.01); *B03D 1/008* (2013.01); *B03D 1/016* (2013.01); *C01B 33/12* (2013.01);
(Continued)

(58) Field of Classification Search
CPC ...... B03D 1/0043; B03D 1/008; B03D 1/016; B03D 2201/04; B03D 2203/008; B03D 2203/02; C01B 33/12; C22B 1/00
See application file for complete search history.

(56) References Cited

U.S. PATENT DOCUMENTS 2,364,520 A 12/1944 Cole et al.
4,228,277 A 10/1980 Landoll
(Continued)

FOREIGN PATENT DOCUMENTS

CN 101166423 A 4/2008
CN 101896171 A 11/2010
(Continued)

OTHER PUBLICATIONS

Cilek et al: Effect of nanoparticles on froth stability and bubble size distribution in flotation. Int. J. Miner Process, 2015, vol. 138, p. 61.
(Continued)

*Primary Examiner* — Patrick Orme
(74) *Attorney, Agent, or Firm* — Laine IP Oy

(57) ABSTRACT

Frother composition and method of concentrating minerals by flotation. The method comprises providing an aqueous slurry formed by the minerals in finely divided form in water; optionally adding a collector to render the mineral hydrophobic; subjecting the slurry thus obtained to flotation in a flotation cell aerated to form bubbles; and recovering the hydrophobic mineral particles together with the froth to form a concentrate. In the method, an amphiphilic cellulose derivative, is used as such or in combination with a second surfactant as a frother to promote the formation of a stable froth on top of the slurry in the flotation cell. Hydroxypropyl methyl cellulose or hydroxyethyl methyl cellulose are combined with at least one non-ionic organic surfactant or polyglycol esters, for providing a frother. The novel cellulose-based frothers can be used in mineral processing plants (Continued)

to allow for processing of larger quantities of minerals without significant modification of existing facilities.

26 Claims, 4 Drawing Sheets

(51) Int. Cl.
  *B03D 1/016* (2006.01)
  *C01B 33/12* (2006.01)
  *C22B 1/00* (2006.01)

(52) U.S. Cl.
  CPC .... *B03D 2201/04* (2013.01); *B03D 2203/008* (2013.01); *B03D 2203/02* (2013.01); *C22B 1/00* (2013.01)

(56) References Cited

U.S. PATENT DOCUMENTS

| | | |
|---|---|---|
| 4,683,004 A | 7/1987 | Goddard |
| 2010/0044280 A1 | 2/2010 | Viljoen et al. |

FOREIGN PATENT DOCUMENTS

| | | | | |
|---|---|---|---|---|
| CN | 103721860 A | 4/2014 | | |
| CN | 106830750 A | 6/2017 | | |
| CN | 107073380 A | 8/2017 | | |
| JP | S6245697 A | 2/1987 | | |
| WO | WO-2015179461 A1 * | 11/2015 | ........... | B29C 65/004 |
| WO | WO-2018007418 A2 * | 1/2018 | ........... | B03D 1/0043 |

OTHER PUBLICATIONS

Drzymala et al: Classification of Flotation Frothers. Minerals, Feb. 7, 2018, vol. 8, No. 2, p. 53.

Finch et al: Role of frother on bubble production and behaviour in flotation. 2008, Min. Eng., vol. 21, pp. 949-957.

Khoshdast et al: Flotation Frothers: Review of Their Classifications, Properties and Preparation. The Open Mineral Processing Journal, Oct. 4, 2011, vol. 4, No. 1, pp. 25-44.

Nuorivaara et al: A study on the properties of foams produced with cellulose-based molecules with an outlook on flotation. IMPC 2016—28th International Mineral Processing Congress, Jan. 1, 2016, vol. 1, pp. 1-16.

Shamin et al: Comparative Study of Effect of Surfactant-Polymer Interactions on Properties of Alkyl Polyglucosides and Alpha Oletin Sulphonate. Journal of Surfactants Ano Detergents, Oct. 5, 2011, vol. 15, No. 3, pp. 291-298.

Wiese et al: The effect of the reagent suite on froth stability in laboratory scale batch flotation tests. Min. Eng., 2011, vol. 24, pp. 995-1003.

\* cited by examiner

CELLULOSE-BASED DERIVATIVES AS CHEMICAL AIDS FOR MINERAL ENRICHMENT IN FROTH FLOTATION

FIELD OF THE INVENTION

The present invention relates to the separation of solids by froth flotation. In particular, the present invention concerns a frother composition and a method of froth flotation for example for mineral enrichment.

BACKGROUND

The demand of raw materials has steadily increased in a global scale due to demographic and economic changes. If the current trends on raw materials consumption continue, there is an impending risk that State-of-the-Art (SoA) technologies will not be able to supply this rising demand. It is therefore necessary to acknowledge that the production of raw materials requires to be supported as a strategic need, through the exploration of new technologies that could help satisfy this impending need for raw materials.

An additional challenge for the mining industry is that, as the world's mineral reserves are depleted and the consumption of metallic raw materials increases, the mining industry needs to process ever larger quantities of low-quality extracted material to produce concentrates in quantities that are sufficient to cover current and future demand.

Associated to these needs, the minerals trapped in tailings ponds have started to draw the attention as a potential source of raw materials, as several of the current ore bodies approach depletion. Nonetheless, the valuable minerals in tailing ponds are still uneconomical to process using SoA technologies.

Therefore, the search of alternative technologies for the treatment of tailings with the purpose of reprocessing is a topic of interest in the mineral processing industry. It is worth to keep in mind that the amount of tailings all around the world is immense and if a feasible processing method were found, this could be translated in a vast feed stream for the metals industry (Kooroshy et al., 2009).

To address the need to process larger quantities of minerals with lower concentration (a.k.a., grade) of valuable materials, the current trend is the construction of ever-larger flotation cells, aiming at obtaining lower costs per cubic meter of processed slurry. This approach represents large capital investments and has practical limitations, from the large facilities required to accommodate these cells, to the physical limitations associated with their construction. Bearing that in mind, our approach is to use new chemical systems to improve the performance of froth flotation separation processes.

Froth flotation separation is one of the most widely used enrichment methods in mineral processing. The production of metals such as copper, gold and platinum undergo flotation separation to produce concentrates that can be refined in an economical way.

Flotation is based on the selective attachment of mineral species to carrier bubbles and their subsequent transportation into a mineral-rich phase. Frothers are chemical additives in the flotation process that improve the stability of the froth phase on which the enrichment of minerals occurs. Frothers are typically surfactant molecules whose froth stabilization properties are generally attributed to the decrease of surface tension in the slurry, and to the formation of electrostatic protective layers on the bubbles that prevent coalescence. Frothers also decrease the bubble diameter, thus promoting higher surface area at the gas-liquid interphase.

The currently used formulations used as frothers in mineral enrichment operations present some limitations. It is acknowledged that their performance is strongly dependent on pH and on the concentration of ionic species in the mineral slurry (Bulatovic, 2007). This may be problematic since natural minerals have variable composition, and the presence of ionic species is almost inevitable in real processing operations.

Further, the reduction of bubble sizes using frothers can only be done up to a certain extent before reaching concentrations that are uneconomical or fundamentally limiting. Currently, efforts are set to gain a better understanding on the frother phenomena and its control, but a truly novel frother system has not been proposed, as most researchers are largely exploring classical surfactant-based additives (Cilek and Karaca, 2015; Finch et al., 2008; Wiese et al., 2011).

SUMMARY OF THE INVENTION

It is an aim of the present invention to provide a novel composition useful as a frother for example for mineral enrichment.

It is another aim to provide a method of enriching minerals.

We have discovered a new formulation for these additives, typically called "frothers" based on surfactant cellulose derivatives, which either alone or preferably mixed with non-ionic surfactant molecules (e.g., polyglycol ethers or alcohols or combinations thereof), improve the efficiency of mineral flotation operations. A further advantage of this new chemical formulation is the acceleration of the flotation process, which may be translated into higher production capacities in the mineral processing plants.

More specifically, the present invention is mainly characterized by what is stated in the characterizing parts of the independent claims.

Considerable advantages are obtained by the present invention.

The use of cellulose-based molecules is a step towards the use of chemicals produced from sustainable sources, a trend that may become more important in the future due to more stringent environmental regulations and the depletion of oil reserves. Furthermore, the present cellulose-based frother formulations are inexpensive and, in this respect, fully competitive with commercially available options.

Further, it appears that the present amphiphilic cellulose molecules, as exemplified by hydroxypropyl methyl cellulose (HPMC), differ from commercial frothers due to their macromolecular size. HPMC, for example, has a different orientation at the air-liquid interface than polyglycol ethers or short-chained alcohols. Once the adsorption onto the air-liquid interface has happened, the unevenly segmented hydrophobic and hydrophilic regions of the macromolecular cellulose derivative orient themselves on the interface according to their specific chemical properties of each macromolecular species which provides for good frother action.

It also appears—although this is merely one possibility and the scope of the present invention is not limited to any specific mode of action that—the interfacial properties of amphiphilic cellulose are such that the amphiphilic cellulose is capable of rendering bubbles more rigid than commercial frothers thus potentially preventing coalescence of the bubbles. In addition, amphiphilic cellulose molecules appear to have a comparatively lower sensitivity to changes in the liquid chemical environment (e.g., pH) during the formation of foams than the currently available frothers.

By using the amphiphilic cellulose together with at least one second surfactant, preferably a non-ionic surfactant, an action of synergy can be reached. As will appear, in embodiments for which experimental details are given below, high level of recovery has been reached for low concentrations of collectors.

A further significant advantage of the present new chemical formulation compared to the frothers currently used is an acceleration of the flotation process, which can be translated into higher production capacities in the mineral processing plants. Based on laboratory-scale experimental data, the kinetics of froth flotation with HPMC were significantly faster compared to the state-of-the-art frothers. Thus, based on laboratory trials performed for the concentration of copper-containing samples, the cellulose-based additives showed the capacity to accelerate the concentration of valuables with a factor 5-10 times faster than commercially-available frother chemicals. A faster separation allows the processing of larger quantities of material in shorter periods of time than is currently possible with state-of-the-art chemical formulations.

With the use of the present cellulose-based formulations, the mineral processing plants have the possibility to process larger quantities of minerals in the same amount of time by using a predetermined chemical formulation, optionally without significant modification of the customer's existing facilities.

The present new frothers can be used in any froth flotation application. These include, but are not be limited to, the concentration of minerals, treatment of mineral waste (i.e., tailings) for reprocessing or for environmental remediation, concentration of artificial ores (e.g., waste electric and electronic equipment) and other floatable waste and purification technologies using flotation, such as micro-flotation for wastewater treatment.

Further features and advantages of the present technology will appear from the following detailed description of embodiments.

Figure 1:
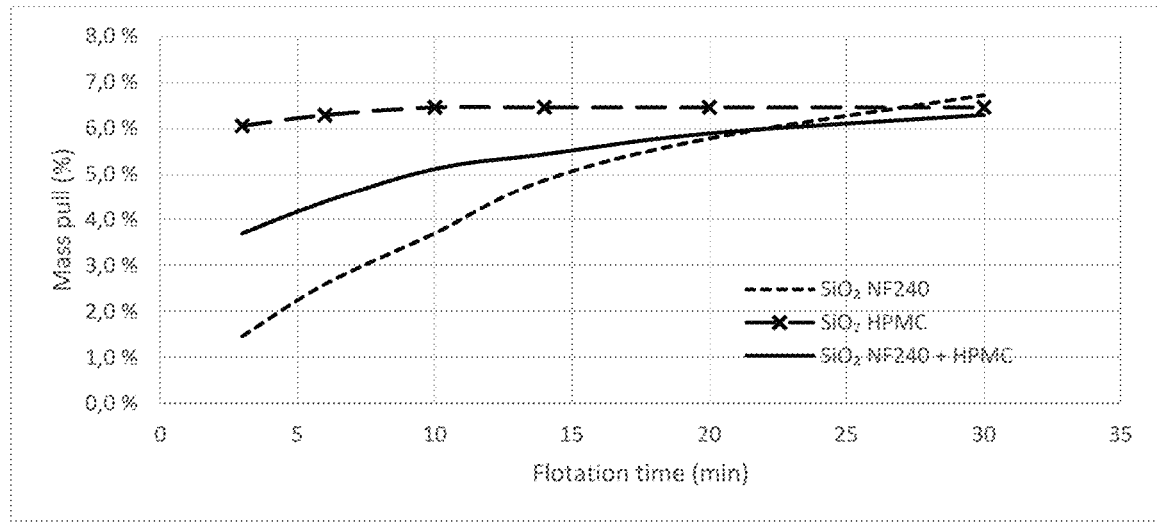
FIG. 1 is a graphical depiction of the mass pull of quartz in flotation experiments using various frother formulations.

Froth flotation is one of the most widely used techniques for the enrichment of valuable minerals extracted from mines. The production of metals such as copper, gold and platinum undergo flotation separation to produce concentrates that can be refined in an economical way.

In the present context the term "frother" is used for a substance or chemical composition which can be used for promoting the formation and optionally also stabilization of a froth for example in flotation. As discussed above, typically frothers decrease surface tension in the slurry, and are capable of forming electrostatic protective layers on the bubbles to prevent coalescence. Frothers also decrease the bubble diameter, thus promoting higher surface area at the gas-liquid interphase.

In particular, the present frothers are capable of promoting the formation and stabilization of a mineral froth phase into which the minerals are separated during flotation.

The present technology comprises the use of amphiphilic cellulose molecules as frother aids. In a general form, amphiphilic cellulose molecules are macromolecules consisting of a cellulose backbone decorated with hydrophobic (e.g., alkyl) and hydrophilic (e.g., hydroxyl) groups. The composition of these functional groups and their degree of substitution in the macromolecular backbone can vary depending on the specific needs of its application.

Examples of amphiphilic cellulose molecules include non-ionic cellulose ethers, including cellulose methyl and hydroxypropyl and hydroxyethyl ethers.

The amphiphilic cellulose molecules can be used alone or preferably in combination with other molecules with surface active properties, such as alcohols, methyl isobutyl carbinol or polyglycol ethers, to fine tune their performance as frother agents in froth flotation operations.

In one embodiment, the chemical structure of the amphiphilic cellulose component is given in Formula I

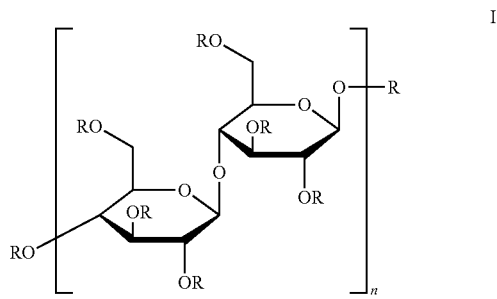

wherein
each R is independently selected from the group of hydrogen, lower alkyl and hydroxyl(lower alkyl),
n stands for an integer in the range of 2 to 100 and
x is an integer in the range of 1 to 10.

In the meaning of R lower alkyl preferably stands for a $C_{1-6}$-alkyl, in particular $C_{1-4}$-alkyl. Examples of lower alkyl groups include methyl, ethyl, n- and i-propyl, n-, i- and t-butyl and linear and branched pentyl and hexyl groups, such as n-pentyl, 3-methylbutyl, and n-hexyl.

The lower alkyl groups can bear 1 to 3 substituents, typically selected from hydroxyl and alkoxy groups, in which the alkoxy groups are derived from lower alkyls, as defined above.

In one embodiment, the chemical structure of the amphiphilic cellulose component is given in the formula

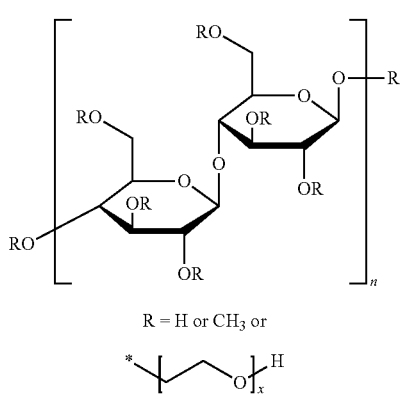

R = H or CH₃ or

wherein n stands for an integer in the range of 2 to 100 and x stands for an integer in the range of 1 to 10.

In one embodiment, in each repeating unit of Formula I, substituents R stand for at least one hydrogen, at least one alkyl group and at least one hydroxypropyl group.

As specific examples of these cellulose derivatives, hydroxyalkyl alkyl ether cellulose, such as hydroxypropyl methyl cellulose and hydroxyethyl methyl cellulose, can be mentioned.

In one embodiment, the (average) molecular weight of non-ionic cellulose ether according to the above formula is in the range of about 500 to 5000 Da which roughly corresponds to a degree of polymerization of 2 to 20.

In one embodiment, an amphiphilic cellulose derivative, in particular ether, is used which has an average molecular weight of about 1.8 to 2.5 kDa.

In another embodiment, an amphiphilic cellulose derivative, in particular ether, is used which has an average molecular weight of about 1.0 to 1.5 kDa.

In one embodiment, the degree of substitution for the alkoxy(l) substituents is in the range of about 1.5 to 2, in particular about 1.6 to 1.9, which gives water solubility. In another embodiment, the degree of substitution for the alkoxy(l) substituents is greater than 2.

The amphiphilic cellulose, such as hydroxypropyl methyl cellulose or hydroxyethyl methyl cellulose, can be used alone. However, alternatively and preferably, the amphiphilic cellulose, such as hydroxypropyl methyl cellulose or hydroxyethyl methyl cellulose, is used in combination with another surfactant, in particular another non-ionic surfactant, preferably particular another organic surfactant.

In one embodiment, the amphiphilic cellulose, such as hydroxypropyl methyl cellulose or hydroxyethyl methyl cellulose, is used in combination with
one or several components selected from the group of:
methyl isobutyl carbinol: $(CH_3)_2CHCH_2CH(OH)CH_3$;
polyglycols having the formula $R(X)_yOH,$ wherein R stands for H or $C_mH_{2m+1}$ and X stands for, most commonly, an alkylene oxide having 2 to 6 carbon atoms, such as propylene oxide (—$C_3H_6O$—) or ethylene oxide (—$C_2H_4O$—), and y stands for an integer of 2 to 6 and m stands for an integer of 1 to 6; and
alcohols having the formula $C_pH_{2p+1}OH$
wherein p stands for an integer of 1 to 10.

In addition to the listed second surfactants also other conventional frothers can be used, such as cyclic alcohols and natural oils and alkoxy paraffins.

In one embodiment, the amphiphilic cellulose is combined with non-ionic organic surfactants, in particular oligomeric non-ionic organic surfactants, such as glycol-based frothers, for example polyglycol esters, such as methyl isobutyl carbinol.

"Oligomeric" stands for a compound comprising 1 to 10 repeating units.

In Formula I, the repeating unit is placed in brackets.

The mass ratio between the amphiphilic cellulose to the second surfactant ranges from 0.1:10 to 10:0.1, in particular 0.5:5 to 5:0.5, for example about 0.75:1.5 to 1.5:0.75.

In one embodiment the hydroxyalkyl methyl cellulose is employed in combinations with methyl isobutyl carbinol at a mass ratio of about 0.8:1.2 to 1.2:0.8, in particular at a mass ratio of about 1:1.

There can be used, generally 2 to 10 second surfactants, although 2 to 4 surfactants (including the amphiphilic cellulose) is generally sufficient.

The surfactants can be added together. Alternatively, the surfactants can be added separately (sequential addition).

In one embodiment, a frother composition contains about 0.1 to 100% by weight of the frothing agent or the frothing agents.

In one embodiment, the separately added surfactants can be added as such or formulated into—or be present as—compositions, typically liquid compositions for ease of dosing. In one embodiment, such a composition is provided in the form of a liquid, emulsion or dispersion. Typically, the separately fed frother compositions comprise the surfactants in a concentration of at least 20%, for example at least 30%, in particular at least 40%, typically at least 50%, or at least 60%, of the total weight of the composition (and up to 100%).

In one embodiment, the first and the at least one second surfactant are mixed together to form a (combination) composition. Generally, in such an embodiment, the frother composition comprises the at least two surfactants in a joint concentration of at least 20%, for example at least 30%, in particular at least 40%, typically at least 50%, or at least 60%, suitably at least 70% or at least 80%, of the total weight of the composition.

Depending on the surface active component, the frother composition can be a liquid composition, comprising a solution, dispersion or emulsion of the surfactants. The composition can be formed by a first surfactant comprising a cellulose derivative dissolved or dispersed in a liquid medium, such as water, or in a second, liquid surfactant. The composition can also comprise two or more surfactants dissolved or emulgated into a liquid medium, such as water or a solvent or a non-solvent.

Components present in the form of solid matter at room temperature can be provided as powders or granules and mixtures thereof.

In one embodiment, the amphiphilic cellulose ether is provided as a powder. This can be dissolved in water or dispersed in an organic liquid.

The frother compositions may contain conventional additives. Any adjuvants are typically employed in amounts from about 0.1 to 10% by weight of the composition.

The novel frother composition can be used in froth flotation for concentrating minerals. Typically, the froth flotation can be carried out for concentrating ores, such as sulphide ores, including copper, copper-molybdenum, lead, nickel, lead-zinc-iron, copper-lead-zinc-iron, gold-silver, nickel-copper, or nonsulphide ores, such as lithium, tin, tungsten, tantalum.

In a first stage, the minerals are crushed and ground to provide a finely divided material having an average particle size in the range of about 5 to 150 µm, typically about 10 to 120 µm. The finely divided material is the mixed with water to provide a slurry which typically has a solids concentration of about 10 to 50% by weight. Optionally, surface activators (e.g., zinc sulphate) can be admixed with the aqueous slurry.

To achieve flotation of the particles, a substance rendering the mineral particles hydrophobic (or increasing the hydrophobicity of the mineral) can be added. Such a collector substance is typically a surfactant, for example sodium isobutyl xanthate. Typically, sodium isobutyl xanthate is added at about 10 to 100 g/t of mineral solids. Finally, a frother is added at an amount sufficient to give a concentration of 10 to 100 ppm, in particular about 15 to 50 ppm.

The slurry thus obtained is then subjected to flotation in a flotation cell and the slurry is aerated to form bubbles. The pH of the slurry is adjusted to about 10 to 12.5 during flotation. The hydrophobic mineral particles will attach to the bubbles and gather in the froth. They are then recovered with the froth to form a concentrate.

The present frothers can be added as such, for example in the form of powders or granules. They can however also be added in the form of emulsions or dispersions, for example of solids in water or in alcohols.

As will be shown by the examples given below, the present frothers do not require strongly alkaline or acidic conditions. Rather, operation at a pH in the range of about 7 to 13 is possible. For the purpose of adjusting the pH, alkaline or earth alkaline metal hydroxides can be used as well as various amines or ammonia.

Surprisingly it has been found that by using mixtures of amphiphilic cellulose with polyglycols and esters thereof, good recovery of minerals can be obtained at low concentrations of surface-modifying chemicals (aka "collectors"). Thus, based on laboratory trials performed for the concentration of a zinc-containing model ore, mixtures of glycol-based frothers with cellulose-based additives show a significant enhancement in the recovery of Zn, particularly under lower consumption of collectors.

The results show a faster separation of Zn, which allows for the processing of larger quantities of material in shorter periods of time than is currently possible with state-of-the-art chemical formulations.

The following non-limiting examples are presented for illustrative purposes.

EXAMPLES

At the moment, hydroxypropyl methyl cellulose (HPMC) has been chosen as a molecule representative of amphiphilic celluloses in flotation experiments by our group. Studies on the use of HPMC as chemical aid in flotation have been carried out for representative mineral systems, namely, quartz, porphyry copper ore, copper ore tailings and sphalerite. The results of these studies are presented next.

Example 1. Flotation of Quartz

In a flotation experiment, quartz particles with a d50 of approximately 160 µm and a d80 of approximately 240 µm were dispersed in water down to a solids content of 33% and floated using a laboratory scale flotation cell. Three frother formulations were tried, using the same total concentration of 30 ppm: i) a commercially used polyethylene glycol with formulation $C_4H_9(C_2H_4O)3OH$, namely Nasfroth 240 (NF240); ii) hydroxypropyl methyl cellulose (HPMC); and iii) a mixture of NF240 and HPMC at a 1:1 mass ratio. The entrainment tendencies of the frother systems are illustrated in FIG. 1.

Figure 2:
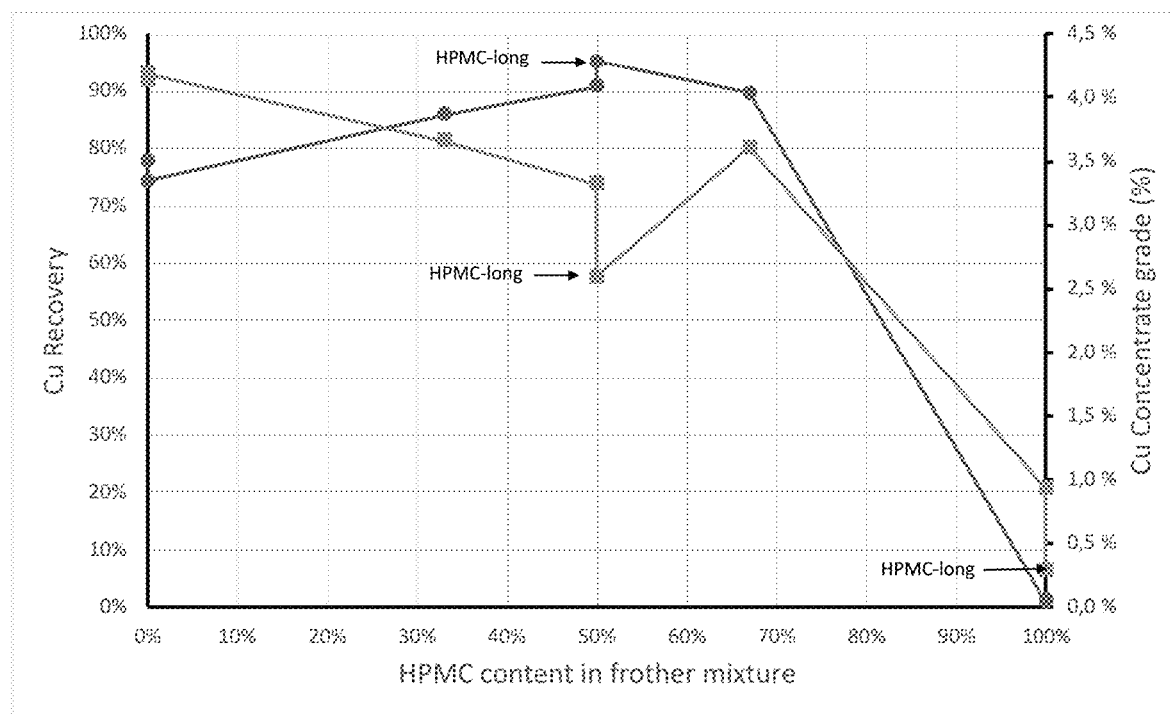
FIG. 2. Cu recovery and grade as a function of HPMC content in frother mixtures; total frother concentration equal to 30 ppm (the points represent mixtures with HPMC-short, unless otherwise noted)

As it can be seen from FIG. 2, while the recovery of quartz after 30 min was practically the same with the three formulations explored, the kinetics of flotation were significantly different. As an example, we can see that after 5 min, the quartz recovery with HPMC has reached a value of ca. 6.3%, while at the same point in time, the recovery using commercial NF240 was of only 2.6%. This shows that any floatable species in the system can be recovered in a shorter period of time using HPMC compared to NF240.

Example 2. Flotation of Copper Ores

A series of flotation experiments were carried out on a natural porphyry copper ore. In these experiments, 5 different frother formulations were tested: i) a commercially used polyethylene glycol ether with formulation $C_4H_9(C_2H_4O)3OH$, namely Nasfroth 240 (NF240); ii) hydroxypropyl methyl cellulose with an average molecular weight of 2.2 kDa (HPMC-long); iii) a mixture of NF240 and HPMC-long at a 1:1 mass ratio; iv) hydroxypropyl methyl cellulose with an average molecular weight of 1.2 kDa (HPMC-short); and v) a mixture of NF240 and HPMC-long at a 1:1 mass ratio. In all cases, the total concentration of frother species used was of 30 ppm.

Flotation experiments were conducted in an Outokumpu 1.5 L laboratory scale flotation cell. In all cases, the flotation cell was operated using the parameters presented in Table 3.

First, the required quantities of mineral and water were measured and added to the flotation cell to obtain a solids content of 50 w-%. The samples were ground in a mill for 25 min with a solid content of 50 w-% before transferring the slurry into the laboratory-scale flotation cell. The particle size distribution obtained after milling had an 80% passing size (d80) of approximately 110 µm. Stirring in the flotation cell started with an impeller speed of 1300 rpm. Additional water was subsequently added to obtain a 33% solids content followed by an additional stirring period of five minutes with an impeller speed of 900 rpm. Next, the chemical aids were added to the stirred mixture with a waiting period of three minutes between each chemical species. The order of chemical addition was $ZnSO_4$, sodium isobutyl xanthate (SIBX) and finally the frothing agents NF240, HPMC-long, HPMC-short or their mixture. The pH regulator was added directly to the water until a pH value of 10 was achieved.

Once a final wetting period of three minutes had elapsed after the addition of the last chemical additive, the impeller speed was increased to 1300 rpm and the air flow was turned on. This marked the beginning of the flotation experiment. The collected froth fractions were divided into six fractions: 0-3 min, 3-6 min, 6-10 min, 10-14 min, 14-20 min and 20-30 min.

The main results of the flotation experiments are presented in Table 1.

TABLE 1

Experimental results for the flotation of porphyry copper ore using various frother formulations

| Frother composition | Mass pull at 30 min (%) | Cumulative recovery at 30 min (%) | Grade at 30 min (%) | Kinetic constant (s$^{-1}$) | $R_{max}$ (%) | Maximum Separation efficiency (%) |
|---|---|---|---|---|---|---|
| NF240 | 4 | 4.3 | 1.22 | 0.083 | 4.53 | 1.04 |
| HPMC-long | 5.14 | 30.2 | 5.24 | 0.784 | 30.13 | 25.5 |
| NF240 + HPMC-long | 11.46 | 40.2 | 3.46 | 0.440 | 39.48 | 30.1 |
| HPMC-short | 1.51 | 3.3 | 2.05 | 0.180 | 3.49 | 1.9 |
| NF240 + HPMC-short | 13.58 | 45.2 | 2.61 | 0.270 | 44.28 | 29.8 |

As seen, under these conditions, the recovery of Cu is significantly higher with HPMC-long, alone or in mixture, compared with the commercial frother. The flotation kinetics with the use of HPMC-long are also faster than that of NF240. It is worth noting that although HPMC-short alone did not present a higher recovery than NF240, the recovery and flotation kinetics of Cu were enhanced when HPMC-short was used as a mixture with NF240.

Example 3. Flotation of Copper Ores Using Various HPMC-Polyglycol Ester Ratios

A series of flotation experiments were carried out on a natural porphyry copper ore. Flotation experiments were conducted in an Outokumpu 1.5 L laboratory scale flotation cell. In all cases, the flotation cell was operated using the parameters presented in Table 2.

TABLE 2

Operating conditions of flotation experiments

| Parameter | Value |
|---|---|
| Air flow rate | 4 l/min |
| Impeller speed | 1300 rpm |
| Flotation time | 30 min |
| Solids content | 33% |
| Total volume of suspension | 1.5 l |

First, the required quantities of mineral and water were measured and added to the flotation cell to obtain a solids content of 50 w-%. The samples were ground in a ball mill at well-defined time intervals with a solid content of 50 w-% before transferring the slurry into the laboratory-scale flotation cell. The particle size distribution obtained after milling had an 90% passing size (d90) of approximately 110 μm. Stirring in the flotation cell started with an impeller speed of 1300 rpm. Additional water was subsequently added to obtain a 33% solids content followed by an additional stirring period of five minutes with an impeller speed of 900 rpm. Next, the chemical aids were added to the stirred mixture with a waiting period of three minutes between each chemical species. The order of chemical addition was ZnSO$_4$, sodium isobutyl xanthate (SIBX) and finally the frothing agents (i.e., NF240, HPMC-long, HPMC-short or mixtures thereof).

The pH regulator (either NaOH or Ca(OH)$_2$, see Table 2) was added directly to the water until a target pH value was achieved. Once a final wetting period of three minutes had elapsed after the addition of the last chemical additive, the impeller speed was increased to 1300 rpm and the air flow was turned on. This marked the beginning of the flotation experiment. The collected froth fractions were divided into six fractions: 0-3 min, 3-6 min, 6-10 min, 10-14 min, 14-20 min and 20-30 min.

TABLE 3

Experimental conditions of flotation experiments for Cu, Zn and Fe-containing ores

| Experiment No. | Frother(s)/ Concentration(s) [ppm] | Milling Time [min] | pH Control (Chemical Used) | Amount of SIBX [g/t]/ ZnSO$_4$ [g/t] | Feed Material |
|---|---|---|---|---|---|
| A.17 | NF240/ 24 ppm | 45 min | pH 12.4 (Ca(OH)$_2$) | 30 g/t + 500 g/t | PS Ore Natural |
| A.30 | HPMC-long/ 30 ppm | 45 min | pH 12.4 (Ca(OH)$_2$) | 30 g/t + 500 g/t | PS Ore Natural |
| A.31 | NF240/ 30 ppm | 45 min | pH 12.4 (Ca(OH)$_2$) | 30 g/t + 500 g/t | PS Ore Natural |
| A.32 | NF240 + HPMC-long/ 16 ppm + 16 ppm | 45 min | pH 12.4 (Ca(OH)$_2$) | 30 g/t + 500 g/t | PS Ore Natural |
| A.35 | NF240 + HPMC-short/ 16 ppm + 16 ppm | 45 min | pH 12.4 (Ca(OH)$_2$) | 30 g/t + 500 g/t | PS Ore Natural |
| A.36 | NF240 + HPMC-short/ 10 ppm + 20 ppm | 45 min | pH 12.4 (Ca(OH)$_2$) | 30 g/t + 500 g/t | PS Ore Natural |
| A.37 | NF240 + HPMC-short/ 20 ppm + 10 ppm | 45 min | pH 12.4 (Ca(OH)$_2$) | 30 g/t + 500 g/t | PS Ore Natural |

The main results of the flotation experiments are presented in Tables 4, 5 and 6 for the recovery Cu, Zn and Fe from the ore respectively.

TABLE 4

Recovery, grade and maximum separation efficiency for Cu

| Experiment No. | Head Grade (calculated) | Total Grade (in froth) | Cumulative Recovery 0-30 min | Max. SE |
|---|---|---|---|---|
| A.17 | 0.88% | 4.13% | 77.89% | 62.97% |
| A.30 | 0.76% | 0.29% | 1.32% | −2.18% |
| A.31 | 0.89% | 4.18% | 74.37% | 60.09% |
| A.32 | 0.87% | 2.60% | 95.16% | 66.10% |
| A.35 | 0.84% | 3.32% | 90.77% | 69.51% |
| A.36 | 0.89% | 3.61% | 89.57% | 69.22% |
| A.37 | 0.86% | 3.66% | 85.86% | 67.40% |

TABLE 5

Recovery, grade and maximum separation efficiency for Zn

| Experiment No. | Head Grade (calculated) | Total Grade (in froth) | Cumulative Recovery 0-30 min | Max. SE |
|---|---|---|---|---|
| A.17 | 1.14% | 1.40% | 20.34% | 3.85% |
| A.30 | 1.02% | 0.31% | 1.04% | −2.45% |
| A.31 | 1.23% | 1.80% | 23.17% | 7.48% |
| A.32 | 1.28% | 1.67% | 41.59% | 9.78% |
| A.35 | 1.17% | 2.06% | 40.22% | 17.59% |
| A.36 | 1.20% | 2.17% | 40.01% | 18.20% |
| A.37 | 1.21% | 2.17% | 36.29% | 16.45% |

TABLE 6

Recovery, grade and maximum separation efficiency for Fe

| | Head Grade (calculated) | Total Grade (in froth) | Cumulative Recovery 0-30 min | Max. SE |
|---|---|---|---|---|
| A.17 | 1.14% | 1.40% | 20.34% | 3.85% |
| A.30 | 1.02% | 0.31% | 1.04% | −2.45% |
| A.31 | 1.23% | 1.80% | 23.17% | 7.48% |
| A.32 | 1.28% | 1.67% | 41.59% | 9.78% |
| A.35 | 1.17% | 2.06% | 40.22% | 17.59% |
| A.36 | 1.20% | 2.17% | 40.01% | 18.20% |
| A.37 | 1.21% | 2.17% | 36.29% | 16.45% |

Figure 3:
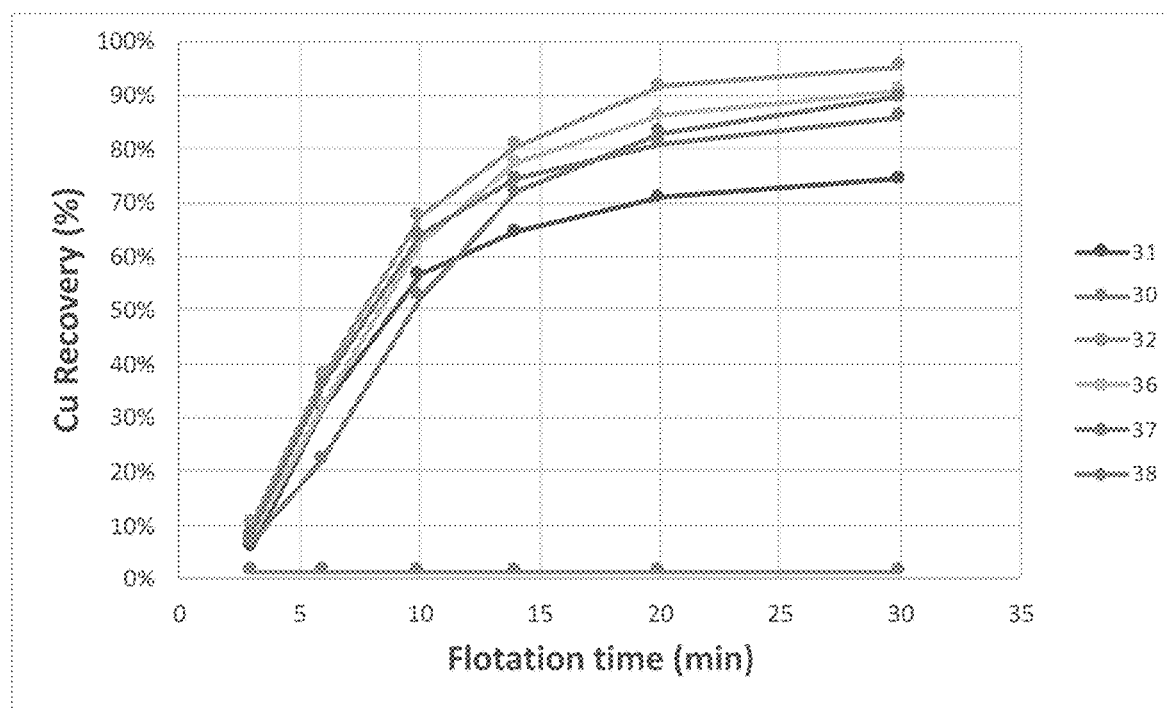
FIG. 3 depicts kinetic curves of Cu flotation from PS Ore Natural using various frothers and frother mixtures.
Figure 4:
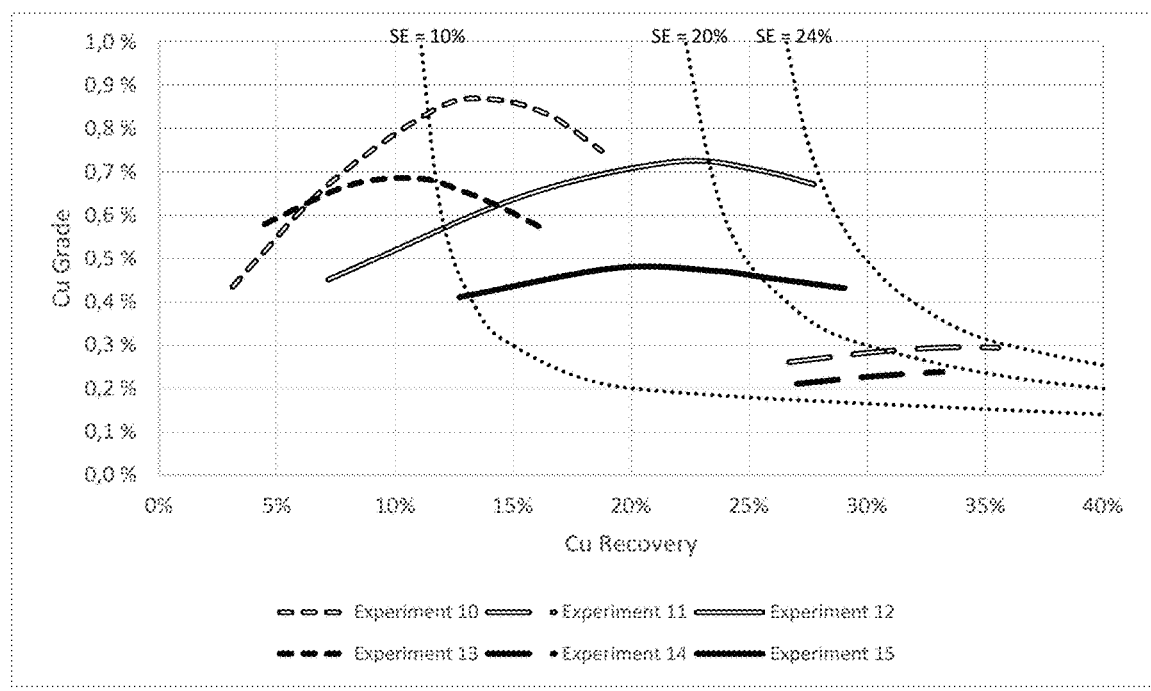
FIG. 4 is a graphical depiction of the grade of copper as a function of recovery of reground samples of copper ore tailings (SE=separation efficiency)

From these results, it is evident that mixtures of HPMC and NF240 offer an advantage in terms of recovery of Cu, as presented in FIG. 2, where the results from experiments 17, 30, 31, 32, 35, 36 and 37 are compiled. Admittedly, some detrimental impact was measured on the grade of Cu. As seen in FIG. 3, it is also worth noting that the kinetics of recovery also appears to be improved when using HPMC-NF240 mixtures compared to the results of pure NF240.

Example 4. Flotation of Tailings

A series of flotation experiments were carried out on waste minerals (a.k.a., tailings) obtained from a concentration plant processing porphyry copper ore. Approximately 20 kg of mineral obtained from the tailings pond were divided into representative samples of approximately 600 g with a Retsch rotary sampling machine. The masses of the samples were confirmed with a Precisa XB 6200D laboratory scale. The particle size characterization of the samples was done with a Mastersizer 3000 in aqueous suspension. Whenever required, regrinding of the samples was done in a laboratory scale ball mill with a volume of 5.67 l using a ball charge of 5.5 kg and a grinding time of 7.5 minutes. The suspension in the grinding mill was 50%-w solids.

The experiments were carried out in a systematic manner using in the first place the tailing minerals as-is, with no surface modifying chemicals at neutral pH. With these experiments, it was aimed at having a benchmark on the behavior of tailings considering their natural status in the tailings pond. Afterwards, a similar set of experiments but under controlled pH=10 was performed in order to approach typical conditions for the flotation of chalcopyrite. A third stage of the experimental evaluation consisted on flotation using a full set of chemical additives resembling those used in industrial operations. A mild re-grinding step was used in subsequent experiments, with the intention to study the effect of mechanical surface re-activation, although evidently this also implies a decrease in the particle size distribution. The experimental conditions with re-ground tailings mirrored those carried out with as-is sample. The total number of experiments carried out in this study, with their corresponding experimental conditions, are presented in Table 2.

TABLE 7

Experimental conditions for flotation experiments with copper ore tailings

| Experiment No | Chemicals | pH | Re-grinding |
|---|---|---|---|
| B.1 | NF240 50 ppm | 5.5 | No |
| B.2 | HPMC 50 ppm | 5.5 | No |
| B.3 | NF240 30ppm + HPMC 16 ppm | 5.5 | No |
| B.4 | NF240 50 ppm | 10 | No |
| B.5 | HPMC 50 ppm | 10 | No |
| B.6 | NF240 30 ppm + HPMC 16 ppm | 10 | No |
| B.7 | ZnSO$_4$ 100 g/t<br>SIBX 100 g/t<br>NF240 50 ppm | 10 | No |
| B.8 | ZnSO$_4$ 100 g/t<br>SIBX 100 g/t<br>HPMC 50 ppm | 10 | No |
| B.9 | ZnSO$_4$ 100 g/t<br>SIBX 100 g/t<br>NF240 30 ppm + HPMC 16 ppm | 10 | No |
| B.10 | NF240 50 ppm | 5.5 | Yes |
| B.11 | HPMC 50 ppm | 5.5 | Yes |
| B.12 | NF240 30 ppm + HPMC 16 ppm | 5.5 | Yes |
| B.13 | NF240 50 ppm | 10 | Yes |
| B.14 | HPMC 50 ppm | 10 | Yes |
| B.15 | NF240 30 ppm + HPMC 16 ppm | 10 | Yes |
| B.16 | ZnSO$_4$ 100 g/t<br>SIBX 100 g/t<br>NF240 50 ppm | 10 | Yes |
| B.17 | ZnSO$_4$ 100 g/t<br>SIBX 100 g/t<br>HPMC 50 ppm | 10 | Yes |
| B.18 | ZnSO$_4$ 100 g/t<br>SIBX 100 g/t<br>NF240 30 ppm + HPMC 16 ppm | 10 | Yes |

Flotation experiments were conducted in an Outokumpu 1.5 L laboratory scale flotation cell. In all cases, the flotation cell was operated using the parameters presented in Table 3.

First, the required quantities of mineral and water were measured and added to the flotation cell to obtain a solids content of 50 w-%. For experiments B.10B.18 the samples were ground in a mill with a solid content of 50 w-% before transferring the slurry into the flotation cell. At this point, stirring in the flotation cell started with an impeller speed of 1300 rpm. Additional water was subsequently added to obtain a 33% solids content followed by an additional stirring period of five minutes with an impeller speed of 900 rpm. Next, the chemicals were added to the stirred mixture with a waiting period of three minutes between each chemical species. The order of chemical addition was ZnSO$_4$, SIBX and finally the frothing agents NF240, HPMC or a mixture of the two. In the measurements where the pH was controlled, the pH regulator was added directly to the water. Once a final wetting period of three minutes had elapsed after the addition of the last chemical additive, the impeller speed was increased to 1300 rpm and the air flow was turned on. This marked the beginning of the flotation experiment. The collected froth fractions were divided into six fractions: 0-3 min, 3-6 min, 6-10 min, 10-14 min, 14-20 min and 20-30 min.

TABLE 8

Key results of flotation experiments with copper ore tailings

| Experiment Conditions | Mass pull at 30 min (%) | Cumulative recovery at 30 min (%) | Maximum grade (%) | Kinetic constant (s⁻¹) | $R_{max}$ (%) | Maximum Separation efficiency (%) | Brief description of set |
|---|---|---|---|---|---|---|---|
| Not ground | | | | | | | |
| B.1 | 0.27 | 0 | 0 | — | 0 | — | No |
| B.2 | 38.35 | 11.1 | 0.02 | 0.58 | 11.08 | −34.62 | collector, |
| B.3 | 27.29 | 6.6 | 0.03 | 0.09 | 6.75 | −15.73 | pH 5.5 |
| B.4 | 0.45 | 0 | 0 | — | 0 | — | No |
| B.5 | 27.52 | 4.9 | 0.02 | 0.30 | 4.99 | −21.68 | collector, |
| B.6 | 4.94 | 11.5 | 0.15 | 0.08 | 12.40 | 4.15 | pH 10 |
| B.7 | 65.00 | 37.0 | 0.06 | 0.06 | 43.15 | −14.09 | With |
| B.8 | 48.31 | 19.7 | 0.03 | 0.53 | 19.24 | −33.59 | collector, |
| B.9 | 61.78 | 37.6 | 0.06 | 0.01 | 100.00 | −14.73 | pH 10 |
| Re-ground | | | | | | | |
| B.10 | 2.41 | 18.8 | 0.87 | 0.07 | 21.49 | 16.41 | No |
| B.11 | 10.14 | 35.6 | 0.29 | 0.47 | 33.81 | 24.03 | collector, |
| B.12 | 4.50 | 27.8 | 0.72 | 0.12 | 29.67 | 23..87 | pH 5.5 |
| B.13 | 3.69 | 16.4 | 0.69 | 0.10 | 16.95 | 13.70 | No |
| B.14 | 14.34 | 33.2 | 0.24 | 0.60 | 31.82 | 19.91 | collector, |
| B.15 | 6.24 | 29.1 | 0.48 | 0.19 | 28.33 | 22.66 | pH 10 |
| B.16 | 66.50 | 42.0 | 0.06 | 0.04 | 63.91 | −22.78 | With |
| B.17 | 53.29 | 43.7 | 0.08 | 0.81 | 43.54 | −7.49 | collector, |
| B.18 | 74.84 | 82.3 | 0.13 | 0.11 | 86.15 | 19.42 | pH 10 |

A very interesting behavior regarding flotation efficiency was obtained when mixtures of NF240 and HPMC were used. As seen in the grade-recovery curves (FIG. 5), there is a potential advantage to be exploited with the use of HPMC and its mixtures. Indeed, the highest reported efficiencies of these experiments were obtained when HPMC or its frother mixtures were used (Exp. 11, 12 and 15). It appears that the optimal flotation performance is a combination of the best characteristics of the two individual frothers via synergistic effect, i.e., a higher grade for NF240 and a higher recovery for HPMC and a decreased bubble size. It is possible that this effect also contributes to the comparatively improved performance obtained. The maximum grade obtained with the frother mixture was of 0.7%, which is suitable for reprocessing in scavenging flotation stages.

Example 5. Flotation of Sphalerite Model Ores

A series of flotation experiments were carried out on a model ore consisting of ca.15 wt % sphalerite and ca. 85% quartz. In these experiments, 5 different frother formulations were tested:
i) a commercially used polyethylene glycol ether with the formulation $C_4H_9(C_2H_4O)3OH$, namely Nasfroth 240 (NF240);
ii) hydroxypropyl methyl cellulose with an average molecular weight of 2.2 kDa (HPMC-long);
iii) a mixture of NF240 and HPMC-long at a 1:1 mass ratio;
iv) hydroxypropyl methyl cellulose with an average molecular weight of 1.2 kDa (HPMC-short); and
v) a mixture of NF240 and HPMC-long at a 1:1 mass ratio. In all cases, the total concentration of frother species used was of 30 ppm.

Flotation experiments were conducted in an Outokumpu 1.5 L laboratory scale flotation cell. In all cases, the flotation cell was operated using the parameters presented in Table 3. The required quantities of quartz were ground in a ball mill for 50 min with a solid content of 50 w-% before transferring the slurry into the laboratory scale flotation cell.

Simultaneously, the necessary amount of sphalerite was ground for 25 seconds in a ring mill. The particle size distribution obtained after milling had an 80% passing size (d80) of approximately 90 μm. Subsequently, the required quantities of mineral and water were measured and added to the flotation cell to obtain a solids content of 50 w-%. Stirring in the flotation cell started with an impeller speed of 1300 rpm.

Additional water was subsequently added to obtain a 33% solids content followed by an additional stirring period of five minutes with an impeller speed of 900 rpm. Next, the chemical aids were added to the stirred mixture with a waiting period of three minutes between each chemical species. The order of chemical addition was $ZnSO_4$, sodium isobutyl xanthate (SIBX) and finally the frothing agents NF240, HPMC-long, HPMCshort or their mixture. The pH regulator was added directly to the water until a pH value of 12 was achieved.

Once a final wetting period of three minutes had elapsed after the addition of the last chemical additive, the impeller speed was increased to 1300 rpm and the air flow was turned on. This marked the beginning of the flotation experiment.

The collected froth fractions were divided into six fractions: 0-3 min, 3-6 min, 6-10 min, 10-14 min, 14-20 min and 20-30 min.

Figure 5:
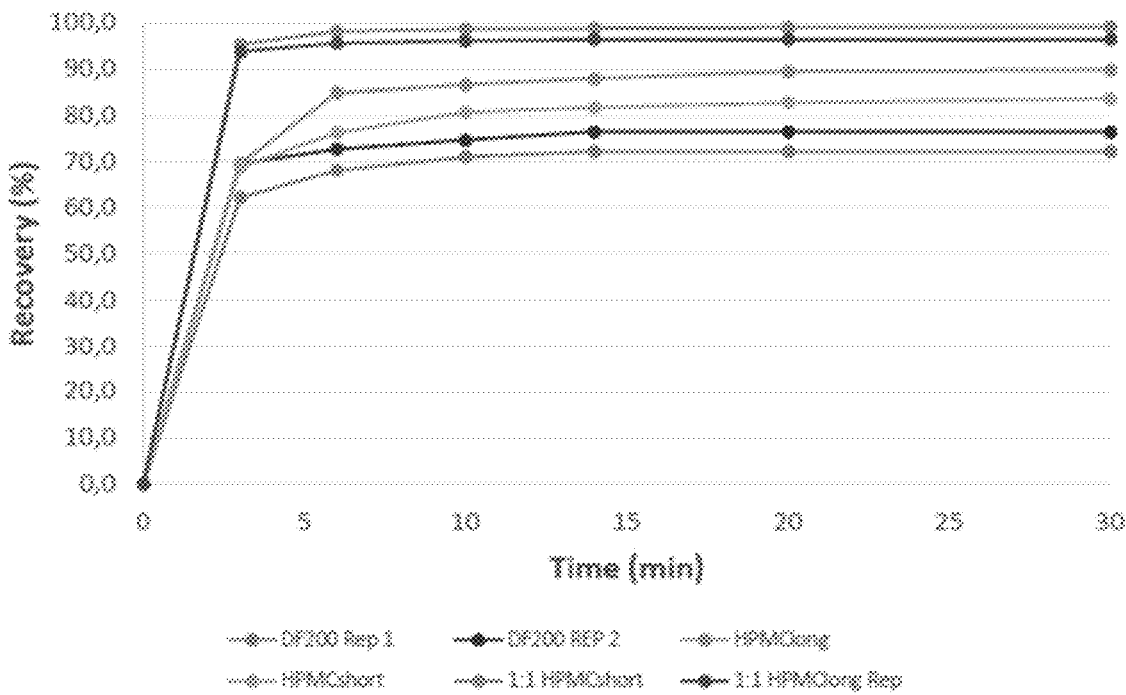
FIG. 5. Recovery of sphalerite using HPMC, NasFroth 240 and their mixtures.
Figure 6:
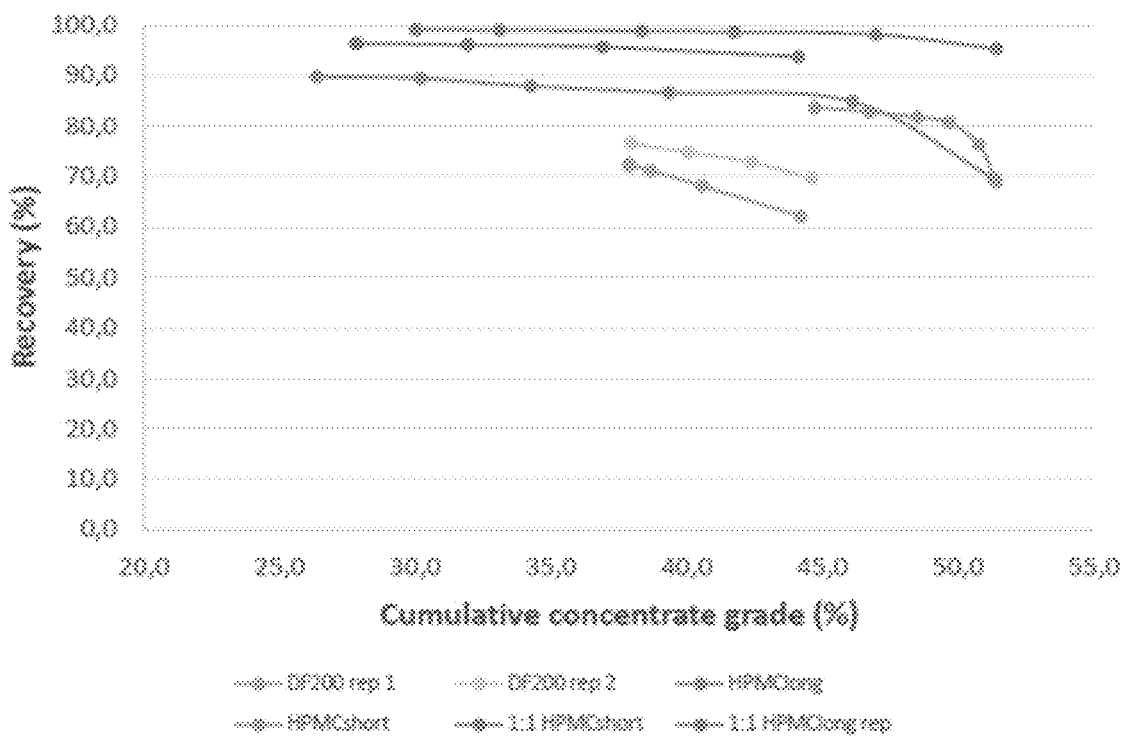
FIG. 6. Grade-Recovery curves for froth flotation of sphalerite model ore using HPMC, Nasfroth 240 and their mixtures.

The main results of the flotation experiments using a collector concentration (i.e., SIBX) of 80 g per ton of solids are presented in FIGS. 5 and 6.

As can be seen, under these conditions, the recovery and grades of Zn are significantly higher with HPMC mixtures, compared with the commercial frother. The flotation kinetics with the use of HPMC mixtures is also faster than that of NF240.

Figure 7:
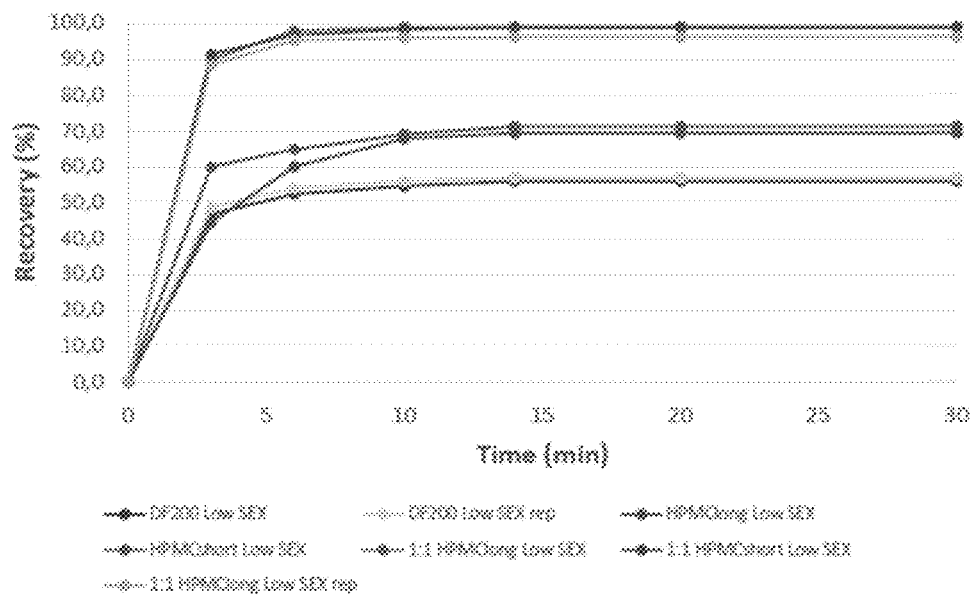
FIG. 7. Recovery of sphalerite using HPMC, NasFroth 240 and their mixtures using low collector concentrations.
Figure 8:
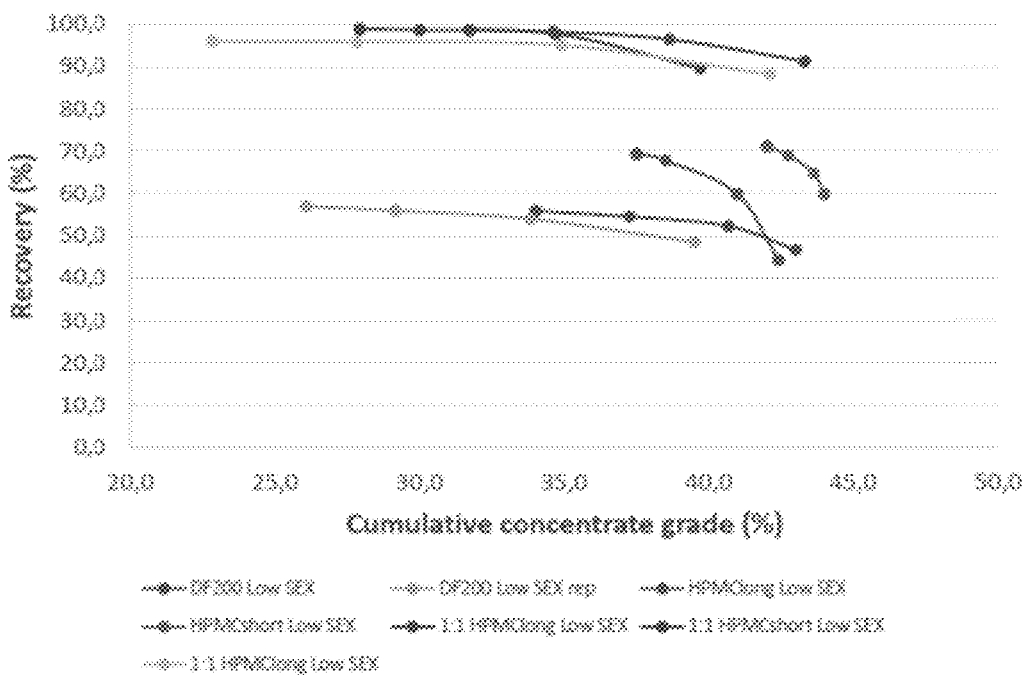
FIG. 8. Grade-Recovery curves for froth flotation of sphalerite model ore using HPMC, Nasfroth 240 and their mixtures using low collector concentrations.

Additionally, experiments were run with a lower collector concentration, i.e., 20 g per ton of solids and the results are presented in FIGS. 7 and 8. While the recovery of the pure components was significantly affected by the lower collector concentration, in particular for the commercial NF240, the mixtures did not exhibit any measurable change in recovery compared to the experiments using 80 g/ton of collector. This is a significant advantage, as it strongly suggests that, with the HPMC-mixture formulation, a high recovery can be obtained, while saving economical resources thanks to a low consumption of collectors.

INDUSTRIAL APPLICABILITY

The present new frothers can be used in any froth flotation application. These include, but may not be limited to, the concentration of minerals, treatment of mineral waste (i.e., tailings) for reprocessing or for environmental remediation, concentration of artificial ores (e.g., waste electric and electronic equipment) and other floatable waste and purification technologies using flotation, such as micro-flotation for wastewater treatment.

The present technology can be used for concentrating copper, zinc, gold and silver, lead, nickel and lithium ores, to mention some examples.

LIST OF REFERENCES

Non-Patent Literature

S. M. Bulatovic, Handbook of flotation reagents, Vol. 1., Elsevier, The Netherlands (2007).
E. C. Cilek, S. Karaca, Effect of nanoparticles on froth stability and bubble size distribution in flotation, Int. J. Miner. Process. 138 (2015) 61.
J. A. Finch, J. E. Nesset, C. Acuna, role of frother on bubble roduction and behaviour in flotation. Min. Eng. 21 (2008) 949-957.
Kooroshy, J., Meindersma, C., Podkolinski, R., Rademaker, M., Sweijs, T. 2009. Scarcity of Minerals. The Hague, Netherlands: The Hague Centre for Strategic Studies. 145 p.
J. Wiese, P. Harris, D. Bradshaw, The effect of the reagent suite on froth stability in laboratory scale batch flotation tests. Min. Eng. 24 (2011) 995-1003.

The invention claimed is:

1. A composition comprising:
amphiphilic cellulose as a surfactant in combination with a non-ionic surfactant, wherein the non-ionic surfactant is selected from the group consisting of:
methyl isobutyl carbinol;
polyglycols having the formula $R(X)_y OH$, wherein R stands for H or $C_m H_{2m+1}$ and X stands for propylene oxide (—$C_3H_6O$—) or ethylene oxide (—$C_2H_4O$—), and y stands for an integer of 1 to 6 and m stands for an integer of 1 to 6;
alcohols having the formula $C_p H_{2p+1} OH$, wherein p stands for an integer of 1 to 10;
and combinations thereof, and
wherein the composition is a frother composition.

2. The composition according to claim 1, wherein the amphiphilic cellulose is selected from non-ionic cellulose ethers.

3. The composition according to claim 1, wherein the amphiphilic cellulose is a non-ionic cellulose ether having Formula I:

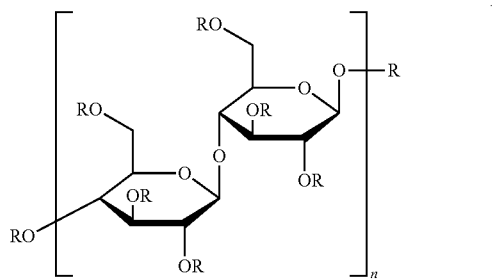

wherein
each R is independently selected from the group consisting-of hydrogen, lower alkyl and hydroxyl (lower alkyl), and
n stands for an integer in the range of 2 to 100.

4. The composition according to claim 3, wherein, in each repeating unit of Formula I, substituents R stand for at least one hydrogen, at least one alkyl group, and at least one hydroxyethyl or hydroxypropyl group.

5. The composition according to claim 3, wherein in the amphiphilic cellulose of Formula I, R is H or $CH_3$ and n is 4 to 100.

6. The composition according to claim 1, wherein the amphiphilic cellulose is selected from the group consisting of hydroxypropyl methyl cellulose, hydroxyethyl methyl cellulose, and combinations thereof.

7. The composition according to claim 1, wherein the amphiphilic cellulose is a non-ionic cellulose ether having an average molecular weight (Mw) in the range of 500 to 5000 Da.

8. The composition according to claim 1, wherein the composition contains in addition to amphiphilic cellulose at least one further surfactant selected from non-ionic organic surfactants.

9. The composition according to claim 1, wherein a mass ratio of the amphiphilic cellulose to the non-ionic surfactant ranges from 0.1:10 to 10:0.1.

10. A method of concentrating minerals by flotation, comprising
providing an aqueous slurry formed by the minerals in finely divided form in water;
optionally adding a collector to render the mineral hydrophobic or to increase the hydrophobicity of the minerals;
subjecting the slurry thus obtained to flotation in a flotation cell aerated to form bubbles; and
recovering the hydrophobic mineral particles together with froth to form a concentrate; said method further comprising adding the frother composition of claim 1 to promote the formation of a stable froth on top of the slurry in the flotation cell.

11. The method according to claim 10, wherein sodium isobutyl xanthate is added as a collector.

12. The method according to claim 10, wherein the aqueous slurry is mixed with zinc sulphate.

13. The method according to claim 10, wherein the concentration of mineral particles in the slurry is in the range of 10 to 50% by weight.

14. The method according to claim 10, wherein the frother is added so as to obtain a concentration of 10 to 100 ppm.

15. The method according to claim 10, wherein the pH of the slurry is adjusted to about 10 to 12.5 during flotation.

16. The method according to claim 10, wherein the frother comprises an amphiphilic cellulose ether having Formula I:

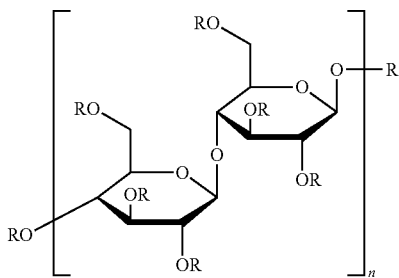

wherein each R is independently selected from the group of hydrogen, lower alkyl, and hydroxyl (lower alkyl), and n stands for an integer in the range of 2 to 100.

17. The method according to claim 16, wherein, in each repeating unit of Formula I, substituents R stand for at least one hydrogen, at least one lower alkyl group, and at least one hydroxypropyl group.

18. The method according to claim 16, wherein, in the amphiphilic cellulose ether of Formula I, R is H or $CH_3$ and n is 4 to 100.

19. The method according to claim 10, wherein the frother comprises an amphiphilic cellulose selected from the group consisting of hydroxypropyl methyl cellulose, hydroxyethyl methyl cellulose, and combinations thereof.

20. The method according to claim 10, wherein the amphiphilic cellulose is a non-ionic cellulose ether having an average molecular weight (Mw) in the range of 500 to 5000 Da.

21. The method according to claim 10, wherein the second surfactant comprises a non-ionic organic surfactant.

22. The method according to claim 10, wherein the second surfactant is a non-ionic surfactant selected from the group consisting of methyl isobutyl carbinol;

polyglycols having the formula $R(X)_yOH$, wherein R stands for H or $C_mH_{2m+1}$ and X stands for, propylene oxide ($-C_3H_6O-$) or ethylene oxide ($-C_2H_4O-$), and y stands for an integer of 1 to 6 and m stands for an integer of 1 to 6;

alcohols having the formula $C_pH_{2p+1}OH$, wherein p stands for an integer of 1 to 10;

and combinations thereof.

23. The method according to claim 10, wherein the amphiphilic cellulose is used together with a non-ionic surfactant selected from the group consisting of alcohols, methyl isobutyl carbinol, polyglycol ethers, and combinations thereof.

24. The method according to claim 23, wherein the amphiphilic cellulose is used together with a non-ionic surfactant at a mass ratio ranging from 0.1:10 to 10:0.1.

25. The method according to claim 10, wherein the amphiphilic cellulose and the second surfactant are added simultaneously to the slurry.

26. The method according to claim 10, wherein the amphiphilic cellulose and the second surfactant are sequentially added to the slurry.

* * * * *